Patented Nov. 1, 1932

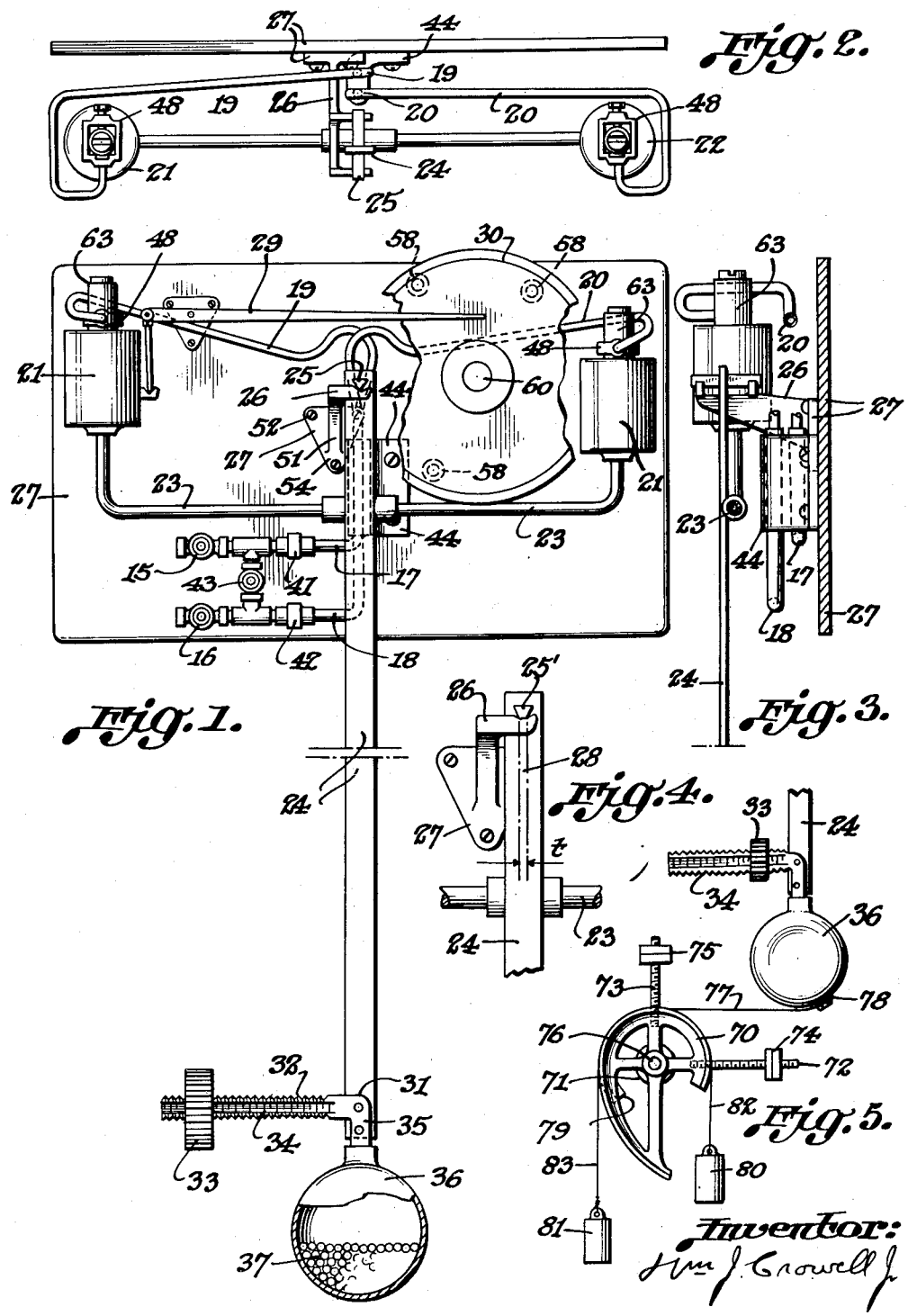

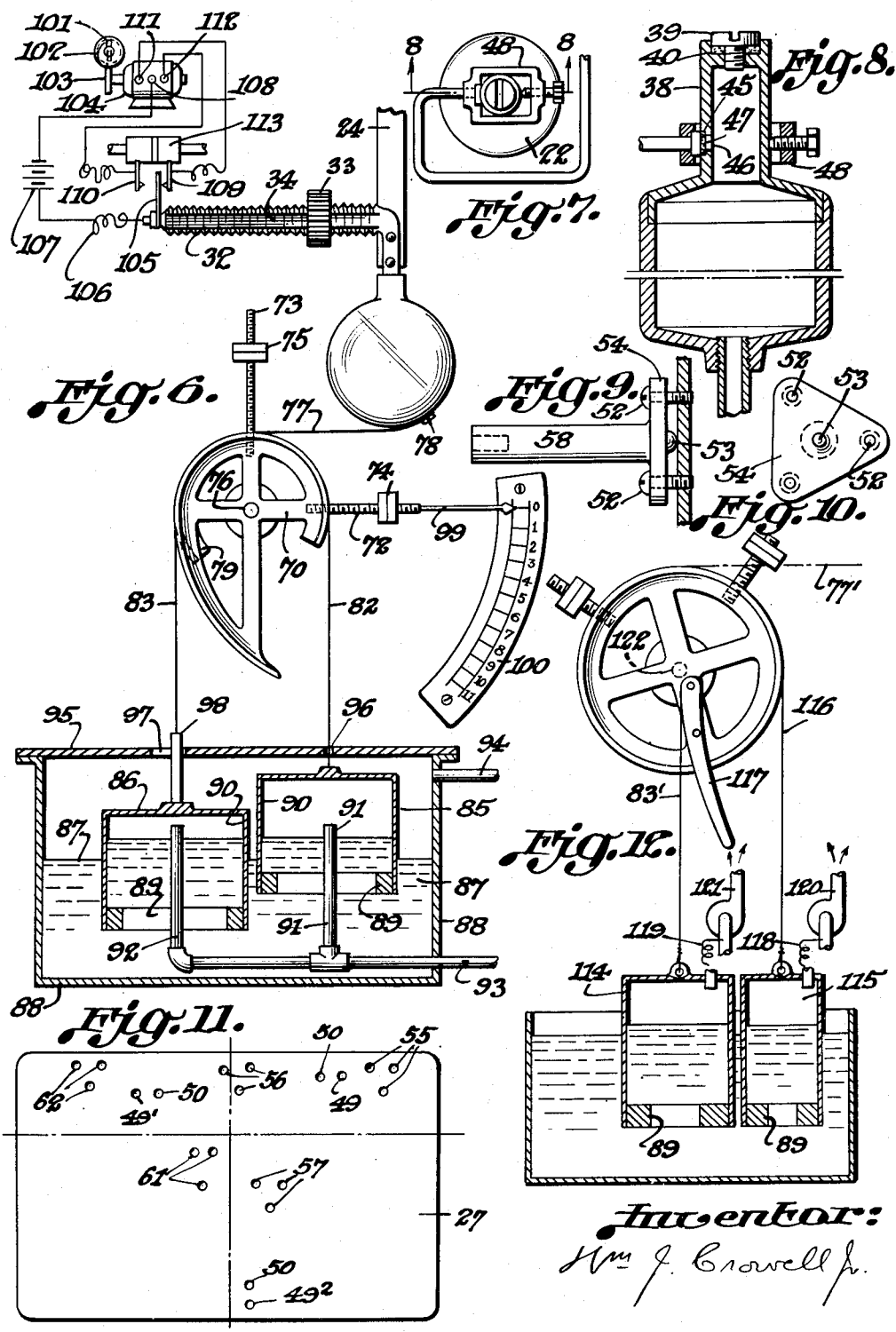

1,885,184

UNITED STATES PATENT OFFICE

WILLIAM J. CROWELL, JR., OF WYNCOTE, PENNSYLVANIA

FLOW METER

Application filed January 16, 1926. Serial No. 81,637.

My invention relates to flow meters with particular reference to a differential balance of the pivoted U tube type in which differential fluid pressure transmits a sealing liquid from one side of the balance to the other resulting in a deflecting moment that is balanced by a restoring moment from angularly deflecting the center of gravity of the balance outwardly from beneath the pivot.

A purpose of my invention is to lessen journal hysteresis and increase sensitiveness of a differential balance of this type by increasing the distance between its pivot and center of gravity.

A further purpose is to make alternatively either square root or rectified records of flow or of the ratio between two flows.

A further purpose is to provide a differential balance adapted to very easy adjustment to any one of widely different ranges of differential pressures.

A further purpose is to avoid unnecessary refinement in machining and assembly of parts by having supporting standards with screw universal slight adjustment.

A further purpose is to avoid danger of trapping air or other gas in the flexible tubings by having an air space in the top of each cylinder above the point of connection with the tubing, and to remove any accumulating air at the top of this air space.

A further purpose is to use a balance substantially neutral balance along its range of angular deflection and to apply a restoring moment at the lower end of the vertical arm directly proportional to the square of the angle of deflection.

In this application I have selected for illustration one main form of my invention with difference in detail according to differences of application, and have selected a form that is easy and inexpensive to manufacture and install, efficient in operation and which well illustrates the principles involved.

Figure 1 is a front elevation showing my balance in one of its simplest applications with some of the parts cut away for the sake of greater clearness.

Figure 2 is a top plan view of part of the structure of Figure 1, with some of the parts removed for clearness.

Figure 3 is a sectional side elevation of the balance element, taken upon the line 3—3 of Figure 2.

Figure 4 is a diagrammatic fragmentary front elevation to illustrate the effect of increasing the distance between the pivot and center of gravity of the balance upon journal hysteresis and sensitiveness.

Figure 5 is a fragmentary view showing a portion of the structure of Figure 1 and illustrating connections to obtain rectified movement of the balance when measuring flow.

Figure 6 is a view very similar to Figure 5 showing a fragment of the structure of Figure 1 and additional connections for making the balance give rectified deflection measuring the ratio between two flows.

Figure 7 is an enlarged fragment of Figure 2.

Figure 8 is a section taken upon line 8—8 of Figure 7.

Figures 9 and 10 are front elevation and bottom plan views respectively of one of the supporting members and illustrates the universal slight adjustment used in all of the supporting standards.

Figure 11 is a front elevation of a detail, for illustrating in conjunction with Figures 9 and 10, the universal slight adjustment in the supporting members.

Figure 12 is a front elevation illustrating a modification of structure shown in Figures 5 and 6.

Describing in illustration and not in limitation and referring to the drawings:—

This invention relates to that class of flow meters that comprise a U tube upon a pivoted vertical arm intermediate to the vertical cylinders of the U, as illustrated in my U. S. Patents Nos. 1,336,511, 1,336,512 and 1,308,626.

In my former invention, disclosed in these patents, I did not realize the great advantage of increasing the distance between the center of gravity of the balance and its pivot support, nor realize the easy application of the balance to a ratio between two flows, nor did I realize advantageous structural details of the present application that permit very easy assembly and disassembly by reason of slight universal adjustment in the supporting standards.

The balance in one of its simplest applications is illustrated in Figures 1, 2 and 3.

Differential pressure produced by any flow is transmitted through valves 15 and 16, pipes 17 and 18 to the flexible tubings 19 and 20 and the vertical cylinders 21 and 22. These cylinders are carried upon a connecting pipe 23 which in turn is rigidly fastened to the vertical arm 24. This arm is supported upon its knife edge pivot 25 by bearing 26 fastened to the plate 27. The higher pressure connects to the right-hand cylinder and the lower pressure to the left-hand cylinder. The cylinders are sealed and partially filled with suitable liquid as mercury, filled desirably to the level of the pivot when the differential pressure is zero.

The higher pressure transmitted through flexible tubing 20 to the right-hand cylinder forces sealing liquid from the right-hand cylinder to the left-hand cylinder and the resultant transfer of weight tips the balance to an extent determined by ultimate equilibrium between the deflecting moment as measured by the weight of liquid transferred from one side of the balance to the other, multiplied by the horizontal distance of transfer (which is the distance between the cylinders) and the restoring moment which increases with increasing deflection.

In the form of Figure 1 this restoring moment is equal to the product of the weight of the balance, (including that of the untransferred sealing liquid), the distance between the balance pivot and its center of gravity, and the sine of the angle of deflection.

Algebraically $KBH = WL \sin \alpha$. Where K is a constant, B is the horizontal distance between the cylinders, H is the impressed differential, W is the weight of the balance, L is the vertical distance between its pivot and center of gravity and $\alpha$ is the angle of deflection.

The product WL may be taken as measuring the restoring moment per unit angle of deflection so that for a given angle of deflection the total weight W deflecting will be smaller the larger L is made.

In practice a knife edge pivot always has a finite thickness and this condition of more or less dullness of edge introduces what I here call journal hysteresis.

In Figure 4 I show a pivot 25' having the dullness exaggerated so that a vertical zone 28 of thickness $t$ beneath the knife edge is vertically beneath supporting portions of the knife edge.

As a result the center of gravity of the balance may occupy any position within this zone 28 without having any tendency whatever to change the position of the vertical arm.

This zone is as it were a dead zone which angularly is measured by $t/L$ where $t$ is the width of the dead zone and L is the vertical distance between the center of gravity of the balance and the knife edge.

Obviously $t$ is determined by the sharpness of knife edges as obtained in commercial manufacture and requirements to stand up under the wear of service and therefore $t$ is not subject to any considerable modification.

If the knife edge were made razor sharp it would not wear so that in practice it is not feasible to materially reduce $t$. On the other hand L may be increased and the hysteresis measured by $t/L$ may be made negligibly small by sufficiently increasing L.

It is obvious also that for a given value WL of restoring moment per unit angle, the weight of the balance will decrease when L is increased as W must decrease in inverse proportion to maintain the desired WL for the restoring moment so that increasing L has the double advantage of reducing the dead zone 28 to a negligible value and of reducing friction by reducing the weight of the balance.

These two things make the balance very much more sensitive when the distance between pivot and center of gravity is made large.

The balance as shown in Figures 1 to 3 is extremely sensitive, and has but two adjustments one to change the setting of the pen 29 upon the record chart 30 and the other to change the range of the balance with respect to differential pressure, that is to change the ratio between deflection and differential pressure.

The vertical arm 24 is desirably formed of a piece of thin flat steel. At its upper end it carries the knife edge 25 and at its lower end it carries a laterally and downwardly extending threaded member 31. Upon the lateral portion 32 of this member I show a nut 33 for use in setting the pen to zero and also for use in conjunction with a scale 34 for calibrating the balance.

The downwardly extending portion 35 of this member removably carries a hollow container 36 which is partially filled with weighting material such as shot 37.

The quantity of weighting material within this container controls the ratio between differential pressure and angular deflection of the balance. When the container is most heavily weighted the ratio between differential pressure and angular deflection will be maximum and preferably the dimensions and weights of the parts are selected so that the balance will be neutral when a small but definite amount of weighting material is in the container.

When the balance is neutral any differential pressure results in full deflection of the balance, that is in deflecting it throughout its whole range.

When the balance is neutral its center of gravity (considering the liquid seal as part of the balance) will not be materially affected by angular deflection of the balance. Change of angular position of a neutral balance results in a lateral shifting of the liquid seal in one direction and of the center of gravity of the solid structure in the opposite, the net movement of the center of gravity of the unit being zero.

When the balance is neutral and differential pressure is zero the balance exerts no tendency to occupy one position rather than another and stays in any position to which it may be put.

At this time the center of gravity of the balance is still well below its pivot. If the neutral balance is tipped by hand sealing liquid runs from one side of the balance to the other and the resultant shifting of weight tends to deflect the balance further, a tendency which is exactly offset by the restoring moment due to the center of gravity of the balance moving outwardly from beneath the pivot.

In practice the sealing mercury is preferably lower than the pivotal axis of the balance when the differential pressure is zero, and the rigid portion of the balance has a center of gravity far below its pivotal axis, even when the balance is weighted neutral, in order to make the journal hysteresis and journal friction both low.

The condition of neutrality does not hold except when the balance occupies a position along or near its normal range of deflection and is one that is not quite perfect even throughout the range of deflection due chiefly to the fact that the cylinders of the balance move somewhat out of vertical when they are deflected from mid position. In practice, however, neutrality along the normal range of deflection may readily be made sufficiently near to perfect by having the angle of deflection small and having it deflect from one side of the vertical to the other.

For example in the zero position the vertical arm and cylinders will be say 1½ or 2 degrees to the left of mid position and in final position the cylinders and vertical arm will be 2½ or 2 degrees to the right of mid position.

Neutrality is readily made perfect at three positions of this range, that is at mid-position and at one place each side of mid-position. Thus neutrality may be made perfect at the zero position say 1½ degrees to the left of mid-position, again at mid-position and again at 1½ degrees to the right of mid-position. Intermediate of these positions there will be a negligibly small variation from perfect neutrality.

The balance is readily set neutral or to any desired definite range by charging the container 36 with an amount of shot in excess of that for neutrality, by then noting the requisite lateral movement of the nut 33 to deflect the pen from a reading corresponding to an arm position 1½° to the left of mid-position to that corresponding to an arm position 1½° to the right of midposition, in setting the laterally adjustable weight half way between its two positions during the test, that is at its position for zero deflection of the long vertical arm, and in making the proper change in the amount of shot in the container, as determined by dimensional and weight characteristics of the balance, of the cylinders, and of the adjusting nut.

The arrangement shown in Figure 1 is one in which any differential at all up to an upper limit determined by the dimensions of the cylinders, may be made to give maximum reading on the chart, the range being from zero to any one of these differentials.

Any desired range may be obtained by putting the proper weighting in the container 36, or the range corresponding to any indefinite weighting within the container may be quickly obtained by noting the deflection of the pen corresponding to a definite movement of the nut 33 along the laterally threaded member 32, as read off upon a suitable scale 34.

The definite lateral shifting of this nut results in a definite lateral shifting of the center of gravity of the balance to an extent determined by the dimensions and material of the parts of the balance. The actual ratio is determined very readily either by experiment or by computation.

As best seen in Figure 8 the flexible tubing connects below the top of each cylinder so that there is a space 38 in which any gas or air separating from the liquid within the piping is trapped.

When the cylinders are connected to a differential produced by steam or water it is desirable to have all piping filled with water. If particles of air, separating from this water, become trapped in the flexible tubing the indications of the balance become quite unreliable. This air space 38 at the top of each cylinder avoids any danger of air accumulation in either flexible tubing.

Any air, momentarily within one of these flexible tubings, escapes into the cylinder to rise up into the air space when the balance is being adjusted or during operation of the balance under varying differential heads.

A screw 39 and washer seal 40 at the top of each cylinder makes it very easy to remove any accumulation of air. The screw is loosened until water begins to seep out around it, all air having first escaped before the water begins to come.

The flexible tubings 19 and 20 are carried at one end in sections of pipes 17 and 18 to which the differential pressure is applied through valves 15 and 16 and unions 41 and 42.

A by-pass valve 43 is used to put zero differential pressure upon the balance when setting to zero. At this time the valves 15 and 16 are closed and the bypass valve 43 is opened.

The inner ends of the flexible tubes 19 and 20 are preferably in the pivotal axis of the balance and I secure this result by clamping the pipes 17 and 18 to the plate 27 in such a way that they present their connections with the flexible tubing at this axis.

The pipes 17 and 18 are shown held to place by means of a clamp 44 screwed to the plate 27 (Figures 1 and 2).

The flexible tubes are removably fastened at their respective outer ends to the respective upper portions of the cylinders.

Somewhat inwardly from the outer end of each tube is an annular disc or shoulder 45 (Figure 8) and the cylinder is bored to receive the end 46 of the flexible tubing and counterbored to receive the washer seal 47 and shoulder 45. The screw clamp 48 presses the shoulder to place against the washer as best seen in Figures 7 and 8.

The tubing preferably connects into the upper portion of the cylinder upon the front, and extends frontwardly and then outwardly and backwardly around the cylinder toward the pivotal axis of the balance. Before reaching the pivotal axis of the balance the tubing makes an easy right bend and then bends reversely into the non-flexible pipe 17 or 18 making connection with the non-flexible pipe at or near the pivotal axis of the balance.

When the tubing is connected to the balance in this way its presence appears to have no measurable influence upon the deflection of the balance even with very widely varying static pressures.

Figures 9 to 11 illustrate means for obtaining universal slight adjustment of the different parts of the assembly without need for careful machining to fit.

The plate 27 is bolted to any suitable supporting wall at the triangularly spaced holes 49, 49' and 49². Adjacent each of these holes is a threaded hole 50 for an adjusting screw not shown.

Whether or not the wall is vertical the plate is adjusted vertical by having adjusting screws at the holes 50 suitably screwed inwardly the plate being spaced from the supporting wall and held from engagement with the wall by the ends of these screws.

The pivot standard 26 as well as the other supporting standards of the assembly are each supported by triangularly spaced screws 52 (see Figures 9 and 10). A small projection 53 is a pivot upon the bottom of each of the standards (shown in exaggerated size in Figure 9) and the standard is angularly adjusted into its proper position on this pivot 53 by means of the screws 52 loosely passing through the base 54 of the standard and screwing into the plate 27.

Referring to Figure 11 threaded holes 55, 56 and 57 receive screws supporting the standards 58 for the chart disc 59 which has rigidly fastened to it the clock which revolves the chart. The post of this clock is seen at 60 in Figure 1.

The triangularly spaced threaded holes 61 receive screws supporting the standard for the pivot support 26 while the triangularly spaced threaded holes 62 receive screws to support the standard for the pen pivot.

In assembly the plate is first fastened plumb against a vertical wall, being preferably adjusted exactly plumb by means of the triangularly spaced adjusting screws threaded through holes 50 (Figure 11). The standard for the pivot is next screwed to place by means of screws through the holes 61. The balance is then set to place and the pivot adjustment screws 52 are adjusted until the balance swings parallel to the vertical plate 27. The clock carrying the chart disc is next supported upon standards 58 fastened to place by means of screws through the holes 55, 56 and 57. These screws are adjusted to bring the outer ends of the posts 58 into exact registry with holes upon the chart disc which is then screwed to place against the ends of these posts. The pen pivot standard is now fastened to place and adjusted until the pen moves parallel to the paper.

The pen and balance may be now temporarily lifted away and the pipes 17 and 18 clamped to place by means of clamp 44. The flexible tubes carrying clamps 48 at their outer ends are fastened at their inner ends in the upper ends of the pipes 17 and 18 and the clamps 48 are slipped over the upper portions 63 of the cylinders and make clamp connection with them as already described.

The cylinders may be charged in place with mercury or other sealing liquid at the openings for the screws 39 in the top of the cylinders. Both of the screws 39 are removed when this is done, the mercury being poured in at one cylinder while the other cylinder is vented to atmosphere.

In the form shown in Figures 1 to 3 the deflection of the balance is substantially proportional to differential pressure rather than to the flow producing the differential pressure.

The desirability of having the deflection proportional to differential presure or to flow is very largely one of personal preference. Many engineers like to have a so-called rectified record in which the divisions measuring successive uniform increments of flow are uniformly spaced, while other engineers prefer the somewhat simpler, cheaper and inherently more sensitive structure in which the record is of differential pressure and in which there is substantially square root relation between the flow and throw of the pen.

I illustrate in Figure 5 a desirable form in which the deflection of the balance is rectified so that the deflection is proportional to flow instead of to differential pressure.

The structure includes that of Figure 1, only a fragment of the structure of Figure 1 therefore being shown in Figure 5, the lower end of the vertical arm 24 with the container 36 and adjusting nut 33.

The weighting within the container 36 is such as to make the balance substantially neutral within its range of normal deflection.

The condition of neutrality has already been explained and is one in which the deflecting force is one due only to the impressed differential pressure, being entirely independent of the degree of deflection.

I pivotally mount a cam pulley 70 to turn within a fixed low friction bearing 71. This cam is provided with relatively perpendicular outwardly extending threaded rods 72 and 73 carrying adjustment nuts 74 and 75. By means of these nuts the center of gravity of the cam is adjusted until it lies in the pivotal axis 76 of the cam so that the cam of itself is neutral as to angular position.

The cam is operatively connected to the balance by means of a flexible connection 77 shown fastened to the bottom of the container at 78 and to the cam at 79, so that deflection of the arm 24 is accompanied by a corresponding turning of the cam 70.

Weights 80 and 81 of equal magnitude upon opposite sides of the cam hang from flexible connections 82 and 83 and tend to turn the cam in opposite directions. Normally the tendency toward rotation is thus measured by the difference between the moments exerted by these two weights and as these weights are equal, by the product of either of them into the difference in lengths of their respective arms. The arms are the same when the balance is set to zero. The arm of the right-hand weight 80 remains constant while the arm of the left-hand weight 81 gradually increases by an amount that is proportional to the square of the angle of deflection from zero position.

When the neutral balance 24 deflects under the action of differential pressure impressed upon the cylinders 21 and 22 the container 36 moves to the right rotating the cam upon its axis and increasing the arm of the weight 81 by moving its point of suspension outwardly to the left from the axis 76 with a resultant progressive increasing pull upon the flexible connection 77.

When equilibrium is finally reached the turning moment exerted by the flexible connection 83 is balanced by opposing moments exerted by flexible connections 77 and 82 which may be expressed algebraically by a relation $WB_1 = WB_2 + KHB_3$.

In this relation $W$ is the weight 80 or 81, $B_1$, $B_2$ and $B_3$ are the arm lengths of the respective moments, $K$ is a constant and $H$ is differential pressure applied to the vertical balance 24. In initial position $B_1 = B_2$ and throughout the range of motion $B_1 - B_2 = K_1 \alpha^2$ where $K_1$ is another constant and $\alpha$ is the angular displacement from mid position. $B_3$ is constant and may or may not equal $B_2$.

The relation $WB_1 = WB_2 + KHB_3$ may be written $$W(B_1 - B_2) = KHB_3$$

or $$WK_1\alpha^2 = KHB_3$$

or $$\alpha^2 = \frac{KB_3}{K_1W}H$$

showing that the angular displacement of the cam 70 and therefore of the neutral differential balance 24 varies directly with $\sqrt{H/W}$ or for a given $W$ with the square root of $H$.

It follows that the deflection of the balance is proportional to a flow that produces the differential $H$ if this flow varies directly with the square root of $H$.

With connections as shown in Figure 5 the range is widely adjustable by merely changing the magnitude of the weights 80 and 81.

For any given range of differential the weights 80 and 81 are as shown in Figure 5 both equal and constant. In Figure 6, however, I make these weights proportional to a second differential $H_1$ thereby providing an arrangement in which the deflection is continuously proportional to the square root of the ratio between two differential pressures and therefore continuously proportional to the ratio between the flows producing these differential pressures.

Figure 6 is substantially the same as Figure 5 with the exception that the weights 80 and 81 have been replaced by the downward pull of differential pressure upon inverted bells 85 and 86 dipping into liquid 87 and within a covered container 88, so that the angular deflection of the cam 70 and therefore of the neutral differential balance 24 varies directly with $\sqrt{H/W}$ where $W$ is the downward pull of differential pressure upon the inverted bells, that is, varies with the square root of the ratio of the differential pressure deflecting the balance 24 to that under the bells which is resisting deflection of the balance 24.

The inverted bells are illustrated as of equal dimensions and are floated at 89 so as to be substantially neutral with respect to vertical position. Their vertical walls 90 are preferably made of very thin sheet metal in order that differences in liquid displacement due to differences in vertical position may result in merely negligibly small differences of buoyancy.

Both in Figures 5 and 6 I show the downward pull upon the flexible connections 82 and 83 as equal and at zero position acting upon the cam wheel 70 at equal distances from the cam axis 76. Obviously, however, it is equality of turning moment at the initial position that counts rather than equality of the pulls so that the weight 80 for example can be replaced by a larger or smaller weight than 81 provided the turning moment is kept the same by suitably changing the length of its arm.

In Figure 6 the lower pressure is introduced to the inside of each of the bells by pipes 91 and 92 from a common pressure pipe 93. The higher pressure is introduced outside the bells and above the liquid 87 by the pipe 94.

In Figure 6 the flexible connections 82 and 83 pass through the cover 95 of the container 88 through small openings 96 and 97, that together present a leakage area small as compared to the sectional area of the pressure pipe 94.

During deflection the connection 83 has horizontal motion as well as vertical, while the right-hand connection 82 has no horizontal motion. For this reason the opening 96 loosely fits all sides of the connection while the opening 97 is a slot in the plane of horizontal motion of the connection and sufficiently long to permit free horizontal motion.

This slot is desirably made very narrow, the portion 98 of the suspension connection 83 then comprising a very thin metal ribbon having sides loosely fitting the slot.

Ordinarily the pressure within the container 88 above the liquid 87 will be one very near to atmospheric pressure and the size of the pressure pipe 94 is made sufficient that there may be no material fall in pressure by reason of leakage at the openings 96 and 97.

If desired a sliding cover may be placed over the slot 97 loosely fitting the flexible connection 98 to lessen this leakage but ordinarily this is not needed, the leakage that there is not mattering at all.

The relation $wK_1\alpha^2 = KHB_3$ holds in Figure 6 as in Figure 5 but here $w$ is equal to $CH'$ from which $\alpha$ varies directly as the square root of the ratio between H and H'.

Obviously the cam member may carry an indicator or recording pen 99 to give rectified indication or record upon a suitable scale or chart 100.

The combination shown in Figure 6 is particularly valuable for general testing purposes around big plants, either for measuring or controlling flows or the ratios between flows.

The differential balance 24 may be disconnected at will from the cam member 70 and then used to either record or control high or low pressure flows upon any one of widely different ranges of differential pressure, an amount of shot being added into the container 36 such as will adapt the balance to deflect according to the desired range of differential pressure.

At the same time the cam member 70, and one of the bells 85 or 86 may be used to give a continuous rectified indication or record of a low pressure flow or may be used to control a low pressure flow, or with an additional bell to give a continuous indication or record of a ratio between two low pressure flows or to maintain two low pressure flows in any desired ratio.

The balance 24, separate or not from the cam member 70, is particularly well adapted to maintain a throttled flow to any desired uniform value by automatic electric control of the position of a valve; and I show diagrammatic connections in Figure 6 adjacent to the lateral arm 32 of the balance for doing this. The valve 101 may control a flow to which the balance 24 is responsive.

This valve is illustrated as operated by means of a worm wheel 102, a worm 103 and a reversing motor 104 and the motor is maintained automatically in position to give any desired deflection of the balance.

As shown a contact member 105 having flexible connection 106 through source of energy 107 to the middle terminal 108 of the motor is in position for connection to the end of the lateral arm 32 of the balance. Actual connection is not illustrated in the drawings because the balance has been described as operating to record or measure rather than to control flow. The connection could be made at any suitable deflecting part of the balance 24 or of the cam member 70.

The contact member 105 makes connection with one or other of the contacts 109 and 110 connected to the terminals 111 and 112 respectively of the motor.

Assuming that the balance is carrying the contact member 105, it automatically controls the motor to maintain flow through the valve 102 such as to give the deflection corresponding to that of the setting, and the setting corresponding to the adjusted position of the sleeve 113 may be either by hand or automatic by means of suitable clock or through motor (not shown).

If the balance 24 is connected to the cam member as in Figure 6, and the valve controls one of the differential pressures that operate upon the combined structure, then this valve is automatically adjusted to maintain the deflection uniform and, therefore, to maintain a constant ratio between the flows producing the respective differential pressures.

In this arrangement it is understood that the valve 101 is in a throttled flow so that the flow increases when the valve is moved in one direction and decreases when moved in the other.

In Figures 5 and 6 the cam member 70 is of the nature of a balanced pulley.

In initial or zero position balanced forces (weights 80 and 81 or suction under the bells 85 and 86) operate at equal distances from the pivotal axis of the cam member, and after the cam member has deflected, the restoring moment tending to move the cam member back toward its zero position is that of either one of the downwardly pulling forces (weight 80 or 81 in Figure 5 or the pull exerted by suction under the inverted bell 85 or 86 in Figure 6) multiplied by the difference between the effective lengths of the arms of these opposing weights.

In Figures 5 and 6 the difference between the arms is the effective arm of the cam member at its outermost portion minus the effective length of the arm of the balancing weight.

In Figure 12 I show a form of cam member in which the cam begins at the pivotal axis. This structure avoids the need for balancing weight 80, and, therefore, makes the whole structure to be moved by the neutral balance smaller and lighter and, because lighter, of lesser friction.

The arrangement shown in Figures 5 and 6 is probably more easy to balance at positions very close to the zero, as in practice it is somewhat difficult to suspend a weight exactly in the pivotal axis, and either form may be preferable according to circumstance.

When the form of cam shown in Figure 12 is used to rectify the deflection of the neutral balance 24, the neutral balance is connected to the pulley 70' exactly the same as in Figure 6 and a weight of size to give the desired range of deflection with the existing range of differential pressure is suspended on the flexible connection 83'.

If the cam member 70' of Figure 12 is to be used in conjunction with the differential balance 24 to give a rectified deflection proportional to the square root ratio between two differential pressures, then the weight upon the flexible connection 83' is replaced by an inverted bell 114.

If the cam member 70' of Figure 12 is to be used by itself to record or indicate the square root of a single low pressure differential pressure, this low pressure differential pressure is applied as in Figure 6 to produce a pull upon an inverted bell 115 dipping into the liquid.

This bell is suspended upon a connection 116 passing from and fastened to the pulley. A suitable weight is hung upon the connection 83' carried by the cam 117.

The cam member may be used, as in the structure of Figure 6, to measure the ratio between two low pressure differentials.

Thus the bells 114 and 115, shown in Figure 12, receive suction through flexible connections 118 and 119 that measure the flow of throttled air to the fans 120 and 121 respectively.

The inverted bells 114 and 115 should be floated so as to be substantially vertically neutral as in the structure shown in Figure 6.

The bell 115 is suspended to the pulley and bell 114 to the cam so that suction beneath the bell 115 pulls the bell downwardly to turn the cam member upon its axis 122.

This deflecting moment, equal to the downward pull of the bell 115 multiplied by the arm of the pulley, is balanced by a restoring moment equal to the downward pull due to the suction beneath the bell 114 multiplied by the effective length of the arm of this pull which is desirably made to vary with the square of the angle of deflection from zero position, so that the deflection varies with the square root of the ratio between the differential pressures (here suctions) beneath the bells 115 and 114.

The need for having the differential balance 24 neutral is incident to the advantage which it gives of permitting adjustment to different ranges of differential pressure without changing the form of the cam. It will, of course, be understood that the balance need not be neutral unless this specific advantage of adjustment to different ranges of differential pressure without change in the form of the cam is desired and such an arrangement may readily be made with substantially all of the other advantageous features of my invention.

In view of my invention and disclosure, variations and modifications, to meet individual whim or particular need to obtain part or all of the benefits of the invention without copying the specific structure shown will doubtless become evident to others skilled in the art and I therefore claim all such in so far as they fall within the reasonable spirit and scope of the invention.

Having thus described my invention what I claim as new and desire to secure by Letters Patent is:—

1. In a U-tube type of balance, a long vertical arm, a horizontal forwardly and rearwardly extending pivot at its upper end, a bearing support for the pivot, a U-tube carried by the upper end of the arm from a point beneath the pivot and including vertical arms on opposite sides of the pivot and a pipe connecting the bottoms of the arms, pressure pipes having each an end at the axis of the pivot and flexible connections from the upper ends of the cylinder arms of the U into the open ends of the respective pressure pipes, said flexible connections leaving the cylinder arms from the front, extending forwardly then outwardly and backwardly and inwardly toward the pivot and reversely bending near the pivot to make the connections with the open ends at the axis of the pivot.

2. In a differential balance, spaced vertical cylinders each having an air chamber formed at the top thereof, a pipe connection between the bottoms of the cylinders, a vertical arm carrying the pipe connection, a pivot support at the top of the arm, a pair of pipes from the source of differential pressure to a point near the axis of the pivot, and small bore flexible metal tubings fastened respectively near one end into the respective pipes near the axis of the pivot and at the other end removably connected to the lower portion of the respective air chambers through the sides thereof.

3. In a differential balance, a supporting plate, spaced vertical cylinders, a pipe connection between the bottoms thereof, a vertical arm having its upper end carrying the pipe, a knife edge pivot in the upper end of the vertical arm, a pair of pipes from the source of differential pressure to a point near the axis of the pivot, flexible connections from the respective cylinders to the ends of the pipes near the pivotal axis, a stationary disc for supporting recording charts and a recording clock, indicator mechanism having a stationary pivot offset from the center of gravity of the mechanism and having offset from the stationary pivot a supporting connection with one of the cylinders, the said offsettings adapting the mechanism to maintain connection with the cylinder and to indicate over a chart on the disc in response to movements of the cylinder, means for supporting the disc outwardly from the plate, standards respectively for supporting the pen and the knife edge bearing and a three-screw-and-intermediate-projection connection between each standard and the plate adapting the outer ends of the standard to slight universal adjustment, with respect to the plate, the three screws being at the apices of a triangle that surrounds the projection and the projection being adapted to pivot the standard against the plate.

4. A pair of spaced vertical cylinders, a pipe connection between the bottoms thereof, a vertical arm having an upper end carrying the pipe and thereby carrying the cylinders, a pivot in the upper end of the vertical arm, a fixed bearing support for the pivot, variable weighting upon the bottom of the arm, a lateral arm at the lower end of the vertical arm and in the plane in which the arm deflects and having along it a scale, and a nut threaded on the arm and thus adapted to move along the scale and for use in setting the zero of the balance and in calibrating the balance.

5. A pair of spaced vertical cylinders, a pipe connection between the bottoms thereof, a long vertical arm having its upper end rigidly carrying the pipe at a point intermediate of the cylinders, a horizontal knife edge pivot in the upper end of the arm, a fixed bearing for the pivot, a pen and pen-arm, a chart over which the pen is adapted to move, an operating connection between the pen-arm and one of the cylinders, a variable weighting at the bottom of the vertical arm, a lateral arm at the bottom of the vertical arm and substantially in the plane in which it deflects and having along it a scale, and a nut on the lateral arm.

6. A differential balance having an adaptation to be set substantially neutral with respect to angular deflection throughout its range thereof and to receive a deflecting moment from differential pressure, a horizontally pivoted cam member having its center of gravity substantially in its pivotal axis, having a zero position and a range of angular movement therefrom, having its cam surface on one side of its pivot arcuate, its cam surface on the other side of its pivot being so shaped that the horizontal distance from effective points on said surface to a vertical plane through said pivot progressively increase with progressive increase of angular deflection from the said zero position and having another portion concentric with the pivot, a flexible connection between the neutral balance and the cam member upon the said concentric portion thereof, flexible connections, one depending from the first arcuate surface and the other from the non-arcuate cam surface, a member suspended by each of said last named flexible connections and exerting respectively through said connections uniform and variantly increasing turning moments upon the cam member when the latter member is deflected from a neutral position corresponding to a zero position for the balance.

7. A differential balance having an adaptation to be set substantially neutral with respect to angular deflection throughout its range thereof and having means to receive a deflecting moment from differential pressure, a horizontally pivoted cam member having its center of gravity substantially in its pivotal axis, having a zero position and a range of angular movement therefrom, having its cam surface on one side of its pivot arcuate, its cam surface on the other side of its pivot being so shaped that the horizontal distances from effective points on said surface to a vertical plane through said pivot progressively increase with progressive increase of angular deflection from the said zero position and having another portion concentric with the pivot, a flexible connection between the balance and the cam member upon the concentric portion thereof, weights suspended from the opposite sides of the cam member and exerting respectively a uniform and a variantly increasing turning moment upon the cam member incident to a variantly increasing arm at the varying point of suspension of one of the weights when the latter member is deflected from a neutral zero position corresponding to the zero position of the balance.

8. A first member adapted to move responsively to differential pressure and having means for setting it substantially neutral as to position throughout its range of deflection except with respect to tendency to move from differential pressure, a pivotal support, a unit pivotally mounted thereon comprising a pulley and a cam in rigid connection, said unit having its center of gravity substantially in its pivotal axis, having a zero position and a range of angular movement therefrom and having its cam surface so shaped that the horizontal distances from effective points on said surface to a vertical plane through said pivot progressively increase with progressive increase of angular deflection proportionately to the square of the angular deflection from the zero position, a first flexible connection depending downwardly from the cam, a second member suspended by the connection and adapted, in cooperation with the cam and by reason of the said variant extension, to resist deflection from zero position of the unit with a moment proportionate to the square of the angle of deflection, and a second flexible connection between the first member and the pulley and adapting the first member to deflect the pulley when moved by differential pressure.

9. A differential balance having a zero position and a range of deflection from its zero position along which with zero differential pressure it is substantially neutral, having means to receive a deflecting moment from differential pressure, a horizontally pivoted pulley, a cam member mounted upon the pulley and rigid therewith, the pulley and cam member forming a unit having a center of gravity in the pivotal axis of the pulley and the unit having an angular position of zero deflection on the said axis, and the said cam being so shaped that the horizontal distances from effective points on said cam to a vertical plane through said axis are variant with the angular deflection of the unit from its zero position and effectively increase proportionately to the square of the said angular deflection, a flexible connection between the balance and the pulley, a second flexible connection depending from the cam, a member suspended by the said second flexible connection from the cam member and cooperating with the cam to exert a turning moment upon the unit variantly increasing when the latter is deflected from zero position corresponding to a zero position for the balance.

10. A differential balance having a zero position and a range of deflection from its zero position along which with zero differential pressure it is substantially neutral and having means adapting it to receive a deflecting moment from differential pressure, a horizontally pivoted pulley, a cam member fastened to and cooperating with the pulley to form a unit having a zero position in a range of angular deflection, the center of gravity of the combined unit lying in the pivotal axis thereof and thereby making the unit angularly neutral and the said cam having a horizontal exentension with respect to the said axis, variant with the angular deflection of the unit from its zero position and effectively increasing proportionately to the square of the said angular deflection, a flexible connection between the neutral balance and the pulley adapting the balance to deflect the unit in one direction when moved by differential pressure, a liquid container, an inverted bell dipping into the liquid in the container, a flexible connection suspending the bell from the cam at the end of the said radius, weighting upon the bell making it substantially neutral with respect to its vertical position unless acted upon by differential pressure, means for impressing differential pressure upon the bell with the lower pressure inside of the bell and above the liquid, the bell through its flexible connection exerting a turning moment upon the pulley for resisting deflecting and tending to restore the pulley to its zero position in magnitude substantially proportional to the square of the angle of deflection from zero position.

11. A differential balance having an adaptation to be set substantially neutral with respect to angular deflection throughout its range thereof and having means to receive a deflecting moment from differential pressure, a horizontally pivoted cam member having its center of gravity substantially in its pivotal axis, having a zero position and a range of angular movement therefrom, having its cam surface on one side of its pivot arcuate, its cam surface on the other side of its pivot being so shaped that the horizontal distances from effective points on said surface to a vertical plane through said pivot progressively increase with progressive increase of angular deflection from the said zero position and having another portion concentric with respect to the pivot, a flexible connection between the neutral balance and the cam member upon said concentric portion thereof, flexible connections, one depending from the arcuate and the other from the non-arcuate cam surface, an inverted bell suspended by each of said last named flexible connections and exerting turning moments upon the cam member that for a given pull upon each bell variantly increase when the latter is deflected from a neutral position corresponding to a zero position for the balance, and means for transmitting equal pressures from a flow means to a point beneath each bell.

12. A differential balance having an adaptation to be set substantially neutral with respect to angular deflection throughout its range thereof and having means to receive a deflecting moment from differential pressure, a horizontally pivoted cam member having its center of gravity substantially in its pivotal axis, having a zero position and a range of angular movement therefrom, having its cam surface on one side of its pivot arcuate, its cam surface on the other side of its pivot being so shaped that the horizontal distances from the effective points on said surface to a vertical plane through said pivot progressively increase with progressive increase of angular deflection from the said zero position and having another portion concentric with respect to the pivot, a flexible connection between the neutral balance and the cam member upon said concentric portion thereof, flexible connections, one depending from the arcuate and the other from the non-arcuate cam surface, an inverted bell suspended by each of said last named flexible connections and exerting turning moments upon the cam member that for a given pull upon each bell variantly increases when the latter is deflected from a neutral position corresponding to a zero position for the balance, weighting upon each bell to cause substantial vertical neutrality thereof, and means for transmitting equal pressures from a flow means to a point beneath each bell.

13. In a device for measuring or controlling flow, a horizontally pivoted shaft, a liquid container, inverted bells suspended in the container, piping to beneath each bell adapted to put the bell interior above the liquid into pressure connection with a suction that is responsive to a flow, a pulley and cam member mounted upon the shaft, and flexible connections between the respective bells and the pulley and cam member, the one bell and pulley having respectively an interior area above the liquid into which the bell depends and an effective radius such that the product thereof shall be approximately equal to the corresponding interior area of the other bell multiplied by the cam arm with respect to the pivotal axis and at zero position of the combined cam and pulley and the cam having selected dimensions to progressively increase the said cam arm as an exponential function as great as one, whereby equal and opposite turning moments are exerted upon the shaft when the cam is at zero and a differential turning moment when the cam is deflected that is simultaneously proportional to the suction beneath the bells and to an exponential function of the angular deflection of the shaft from its zero position that is as great as one.

14. A differential balance having means to receive a deflecting moment from differential pressure, a horizontally pivoted pulley, a cam mounted thereon, a liquid container, an inverted bell dipping into the liquid, a flexible connection suspending the bell from the cam, weighting upon the bell adapting the bell to be substantially vertically neutral unless acted upon by differential pressure, a pressure connection to the interior of the bell responsive to a flow and the cam having a form such that the moment arm of the vertical flexible connection supporting the bell shall vary in effective length with the square of the angle of deflection of said cam from zero position, and flexible connection between the bell and the neutral balance.

15. A differential balance having an adaptation to be set substantially neutral with respect to angular deflection throughout its range thereof and including a pair of horizontally spaced vertical cylinders, a pipe supporting the cylinders and connecting the bottoms thereof, a long vertical arm supporting the pipe at a point intermediate the cylinders and near the upper end of the arm, a pivot support for the arm above the pipe adapting the balance to deflect in the plane of the cylinders, a weight at substantially the bottom of the balance, means for supporting the weight from the arm and for adjusting it laterally of the arm in the plane of deflection, a variant weight below the laterally adjustable weight, flexible pressure connections into the cylinders near the upper ends thereof, means for showing the angular position of the balance and having a scale for indicating the adjustment position of the adjustable weight.

16. A differential balance having an adaptation to be set substantially neutral with respect to angular deflection throughout its range thereof and including a pair of horizontally spaced vertical cylinders, a pipe supporting the cylinders and connecting the bottoms thereof, a long vertical arm supporting the pipe at a point intermediate the cylinders and near the upper end of the arm, a pivot support for the arm above the pipe adapting the balance to deflect in the plane of the cylinders, a mount extending laterally from said arm in the plane of deflection, a weight on said mount and adjustable therealong, a variant weight below the laterally adjustable weight, flexible pressure connections into the cylinders near the upper ends thereof, a pen and pen arm, a pivot support for the arm, and a substantially vertical link depending from the pen arm and having a point and socket connection with one of the cylinders at its lower end thereby adapting the vertical position of the cylinder to determine the angular deflection of the pen arm.

WILLIAM J. CROWELL, Jr.